Aug. 20, 1968     B. B. GOULD     3,397,638

ROCKET LAUNCHER

Filed March 8, 1961

INVENTOR:—
BERT B. GOULD
BY
ATTORNEYS

United States Patent Office 3,397,638
Patented Aug. 20, 1968

3,397,638
ROCKET LAUNCHER
Bert B. Gould, Berkeley, Calif., assignor to MB Associates, a corporation of California
Filed Mar. 8, 1961, Ser. No. 94,383
2 Claims. (Cl. 102—49.4)

This invention relates to a multiple stage rocket and more particularly relates to a rocket wherein a relatively large carrier rocket is employed to carry a plurality of miniature rockets and wherein the miniature rockets are fired at about the time of the burn-out of the larger rocket carrier. The miniature rockets may be fired in the same or the opposite direction from that of the rocket carrier.

Miniature rockets created by the assignee of this application are about one-tenth inch in diameter and about one and one-half inches long. Such miniature rockets form highly effective small arms weapons at relatively short range. The rockets are relatively ineffective at ranges much over a few hundred yards and are ineffective against personnel shielded by an obstruction. In accordance with the present invention, both of these problems are effectively solved.

In accordance with this invention, a carrier rocket is employed which can carry a large number of the miniature rockets. The miniature rockets described herein are particularly valuable against masses of personnel targets deployed over a relatively large area. The range of the carrier rocket can be quite large and upon burn-out the smaller rockets are automatically ignited and serve as effective anti-personnel weapons. For many purposes, the miniature rockets will be fired in the same direction that the carrier rocket is traveling, while in other situations the miniature rockets will be fired in a direction opposite that which the carrier rocket is traveling, thus being effective against personnel shielded from the original line of fire.

In the drawings forming part of this application:

Figure 1:
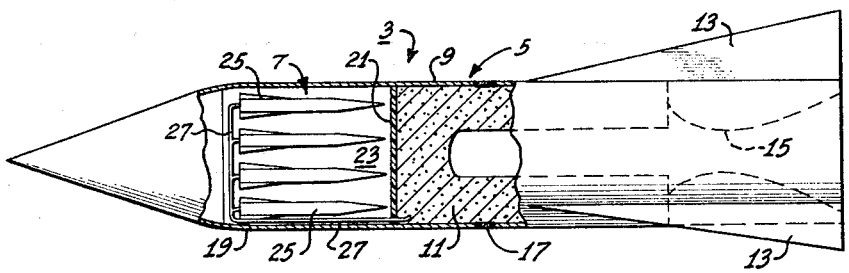
FIGURE 1 is a side view, partially in section, of a multiple stage rocket embodying the present invention wherein the second stage miniature rockets are fired in a direction opposite that from which the carrier rocket is traveling.

Referring now to the drawings by reference characters, there is shown in FIGURE 1 a multiple stage rocket, generally designated 3. The rocket comprises a relatively large first stage 5 and a plurality of miniature rockets 7, said miniature rockets constituting the second stage. The first stage rocket 5 has a casing 9 with a propellant grain 11 therein and stabilizing fins 13. The rocket also embodies a nozzle assembly 15. The case 9 of the first stage is provided with a fusible band 17 so that as the grain burns through to the casing, the band 17 will fuse, permitting the rear part of the casing, including the nozzle and fin assembly, to drop off.

The second stage comprises a casing 19, which may be a continuation of the casing 9, having a frangible wall 21, thus defining a separate forward compartment 23. The forward compartment 23 contains a plurality of miniature rockets 25. A fuse 27 extends into the first stage propellant grain 11 and into each of the miniature rockets 25.

In operation, the main propellant grain 11 is ignited in the usual manner, propelling the rocket 3 on its course. At about the time of burn-out, the band 17 fuses, releasing the rear of the first stage of the rocket and also igniting the fuse 27. Since the fuse 27 leads to the miniature rockets 25, they will be ignited and be propelled in a direction opposite from the movement of the carrier rocket so that they will be effective even against personnel concealed from the original line of fire. It is obvious that the velocity of the original rocket and that of the miniature rockets subtract, so that it is necessary either that the first stage terminal velocity be much less than the terminal velocity of the miniature rockets, or that the fusing be timed so that the carrier rocket will have exhausted a substantial part of its terminal velocity before the miniature rockets are fired.

Figure 2:
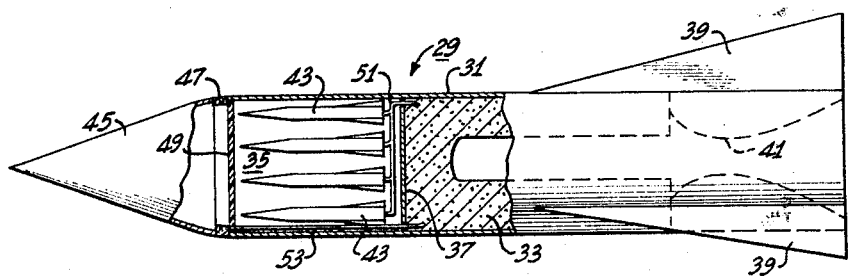
FIGURE 2 is a view, similar to FIGURE 1, of a rocket assembly wherein the miniature rockets are fired in the same direction that the carrier rocket is traveling.

In FIGURE 2, a configuration is shown wherein the miniature rockets are fired in the same direction as that of the first stage rocket. Here the rocket is generally designated 29, having a casing 31 which serves as both the casing for the first stage propellant grain 33 and also provides the forward chamber 35. The first and second stages are separated by a wall 37 which need not be of a frangible nature. The first section is provided with stabilizing fins 39 and a nozzle assembly 41. Within the forward chamber 35 is a plurality of miniature rockets 43. Mounted at the front of the assembly is a nose cone 45 which is connected to the case 31 by means of explosive band 47. A wall of frangible material 49 separates the forward compartment 35 from the nose cone. A first fuse 51 extends from the grain 33 to each of the rockets 43, while a second fuse 53 extends from the grain of the rocket 33 through the forward compartment 35 to the explosive band 47. The fuses 51 and 53 are so proportioned that the explosive band 47 is detonated prior to ignition of the rockets 43. The miniature rockets can be fired before, after or at the time of burn-out of the carrier rocket.

Many variations are possible from the basic structure herein defined. Although a two-stage rocket has been described, it is obvious that the first stage could actually comprise several stages and that when the second stage is referred to, a final stage consisting of miniature rockets is meant.

Various methods can be used for igniting the miniature rockets and also for effecting the separation of the nose cone and/or carrier rocket. Instead of the fusible band 17, means can be provided whereby the nozzle assembly 15 is ejected, so that the entire casing of the carrier rocket serves as a launcher tube for the miniature rockets. Instead of having the nose cone 45 connected by means of an explosive band 47, the entire nose cone can be made of a combustible material and merely burn off. Further, various time-delay devices can be incorporated in the rocket. For instance, it may be desired to not fire the miniature rockets until a substantial length of time after burn-out of the carrier rocket.

I claim:

1. In a multiple stage compartmentized rocket having a first stage aft compartment portion provided with a propellant grain and a second stage forward compartment portion separated therefrom by a substantially imperforate transversely extending wall, a plurality of longitudinally extending rockets in said second stage forward compartment arranged for firing through said first stage aft compartment portion in a direction opposed to the travel of the rocket created by the firing of the first stage portion, the combination including a burnable fuse means extending forwardly from the first stage aft portion and connected to the rockets in the second stage forward portion, said fuse means being arranged to be ignited only after the propellant grain in the aft portion is burning in the area adjacent to the imperforate wall.

2. In a multiple stage compartmentized rocket having a first stage aft compartment portion provided with a propellant grain and a second stage forward compartment portion separated therefrom by a substantially imperforate transversely extending wall, a plurality of longitudinally extending rockets in said second stage forward compartment arranged for firing in the direction of travel of the rocket created by firing of the first stage portion, the combination including a first burnable fuse means extending forwardly from the first stage aft portion and connected to the rockets in the second stage forward portion, said fuse means being arranged to be ignited only after the propellant grain in the aft portion is burning in the area adjacent to the imperforate wall, a second substantially imperforate wall comprising frangible material extending transversely of the forward portion of the rocket and beyond the plurality of longitudinally extending rockets to form a completely enclosed compartment, an explosive means adjacent to said wall, and second burnable fuse means extending forwardly from the propellant grain for ignition of said explosive means to shatter said wall, said second fuse means being arranged to be ignited prior to said first fuse means.

References Cited

UNITED STATES PATENTS

| | | | |
|---|---|---|---|
| 1,102,653 | 7/1914 | Goddard | 102—34.4 X |
| 1,103,503 | 7/1914 | Goddard | 102—34.4 |
| 1,195,107 | 8/1916 | Sheriff | 102—42 |
| 2,114,214 | 4/1938 | Damblanc | 102—34.5 |
| 2,853,946 | 9/1958 | Loedding | 102—49 |
| 2,938,430 | 5/1960 | Pion | 102—49 X |
| 3,048,086 | 8/1962 | Robert et al. | 102—49 X |

FOREIGN PATENTS 793,927   4/1958   Great Britain.

BENJAMIN A. BORCHELT, *Primary Examiner.*

V. R. PENDEGRASS, *Assistant Examiner.*